United States Patent [19]

Nakamura

[11] Patent Number: 5,176,492
[45] Date of Patent: Jan. 5, 1993

[54] GRIPPING DEVICE

[75] Inventor: Haruji Nakamura, Takatsuki, Japan

[73] Assignee: Matsushita Electric Industrial Co., Ltd., Osaka, Japan

[21] Appl. No.: 647,128

[22] Filed: Jan. 17, 1991

[30] Foreign Application Priority Data

Jan. 19, 1990 [JP]  Japan .................................. 2-11275

[51] Int. Cl.⁵ .............................................. B25J 9/00
[52] U.S. Cl. ..................................... 414/730; 29/714;
318/568.18; 318/568.21; 395/94; 901/9;
901/35; 901/39; 901/47
[58] Field of Search ....................... 414/730; 901/9, 35,
901/39, 47; 318/568.18, 568.21; 29/714, 719,
747, 748; 364/513; 395/94

[56] References Cited

U.S. PATENT DOCUMENTS

| 4,462,155 | 7/1984 | Brunelle et al. | 29/720 |
| 4,740,025 | 4/1988 | Nelson | 901/39 |
| 4,766,322 | 8/1988 | Hashimoto | 414/730 |
| 4,825,537 | 5/1989 | Berry | 29/714 |

Primary Examiner—Michael S. Huppert
Assistant Examiner—Donald W. Underwood
Attorney, Agent, or Firm—Wenderoth, Lind & Ponack

[57] ABSTRACT

A gripping system for gripping a wire extending from a circuit board has a pair of claws provided at the end of a robot arm and a sensor for detecting a free end of the wire. A control is provided so that the robot arm is first moved so as to make the claws hold the fixed end of the wire, and then moved so as to allow the claws to slidingly move upwardly along the wire until the sensor detects the free end.

4 Claims, 5 Drawing Sheets

GRIPPING DEVICE

BACKGROUND OF THE INVENTION

1. Field of the Invention

The present invention relates to an automatic assembly machine and, more particularly, to a gripping system for use in an industrial robot.

2. Description of the Prior Art

The range of products which can be handled by automatic assembly machines has recently been expanded from hard and rigid materials to soft and pliable materials, such as electrical lead wires.

As shown in FIG. 6, generally, the gripping device located at the end of a robot arm 31 has a hand 32 having a chuck 33 composed of a pair of movable chuck claws 33a and 33b, and an object detecting sensor 35 composed of a light emitter 35a and a light receptor 35b.

According to the prior art gripping system, the hand 32 moves toward a free end portion 34b of the elongated object 34, such as a lead wire, with the chuck 33 being opened, and grips the object by closing the chuck 33 when the object detecting sensor 35 detects the free end portion 34b of the object 34.

However, when the object 34 extending perpendicularly, for example, from a circuit board is bent or curved at a portion remote from the fixed end due to the flexibility of the object 34, the gripping device employing the prior art gripping system often fails to grip the free end portion of the object 34.

SUMMARY OF THE INVENTION

The present invention has been developed with a view to substantially solving the above described disadvantages and has for its essential object to provide an improved gripping device.

In order to achieve the aforementioned objective, a gripping system is disclosed for gripping an elongated object having a fixed end fixed to a base and a free end remote from the fixed end. The gripping system comprises a robot body having a strength control function on at least one axis, arm means extending from the robot body, chuck means provided at the end of the arm means and being movable between open and closed positions, robot driving means for moving the arm means, chuck driving means for driving the chuck between open and closed positions, a detecting means for detecting the presence of the object, and a position detecting means for detecting the current position of the chuck. In addition, a control means is provided for controlling the robot driving means and the chuck driving means such that the arm means is first moved so as to make the chuck means hold the fixed end, and then moved so as to make the chuck means move slidingly along the elongated object until the detecting means detects the free end of the elongated object.

BRIEF DESCRIPTION OF THE DRAWINGS

These and other objects and features of the present invention will become clear from the following description taken in conjunction with the preferred embodiment thereof with reference to the accompanying drawings and in which.

DETAILED DESCRIPTION OF THE PREFERRED EMBODIMENTS

A preferred embodiment of a gripping system according to the present invention is described hereinbelow with reference to the accompanying drawings.

Figure 3:
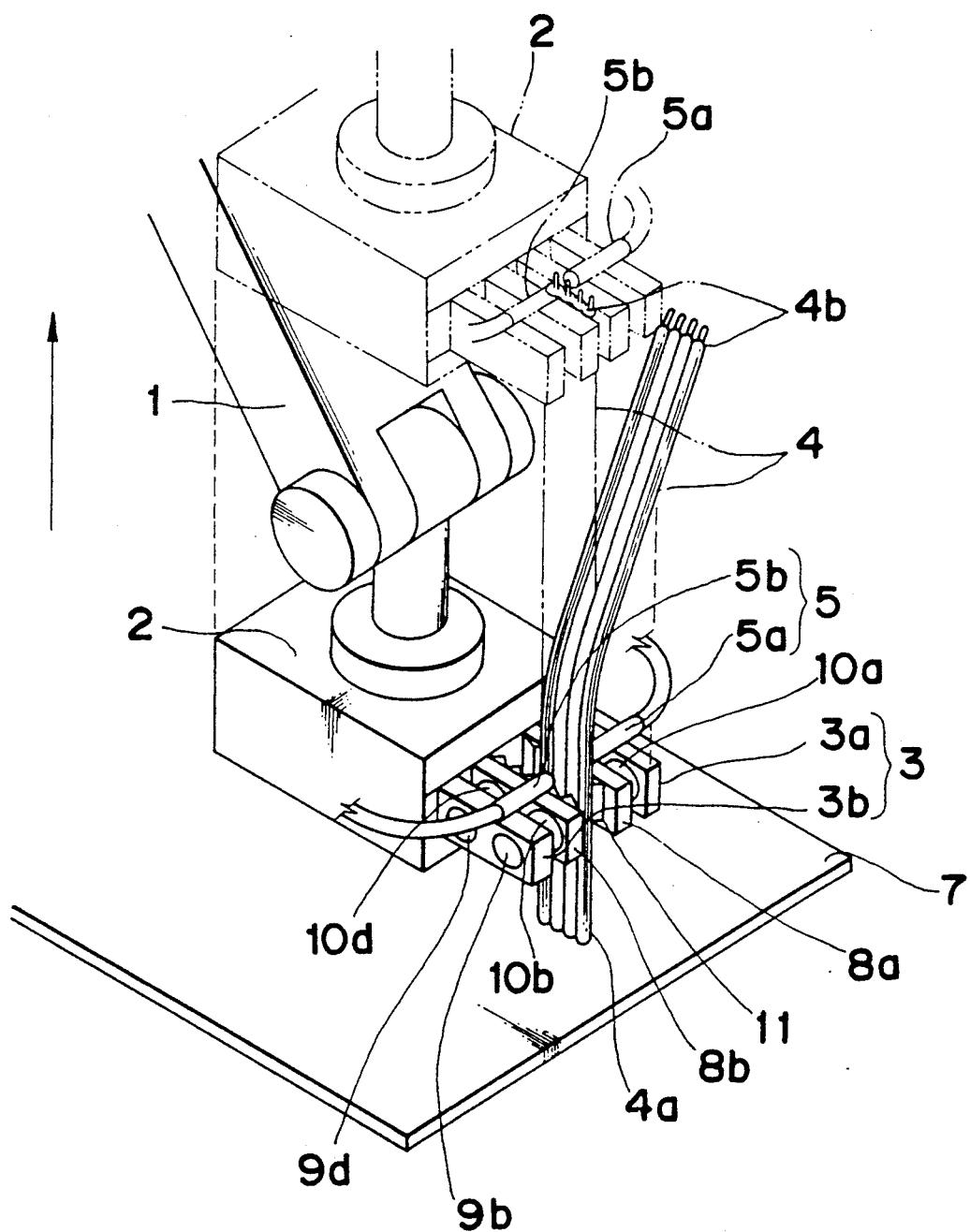
FIG. 3 is a perspective view of a gripping device operated by the gripping system of the present invention.

Referring to FIG. 3, reference number 1 is an arm of a robot extending from one axis (not shown). The robot has a strength control function which can vary the drive force of the robot according to a control program. A hand 2 is provided at one the end of the robot arm 1. The hand 2 comprises a pair of movable chuck claws 3a and 3b, and a detecting sensor 5 having a light emitter 5a and a light receptor 5b for detecting the presence of an object 4 and for producing a sensor signal S6.

Figure 1:
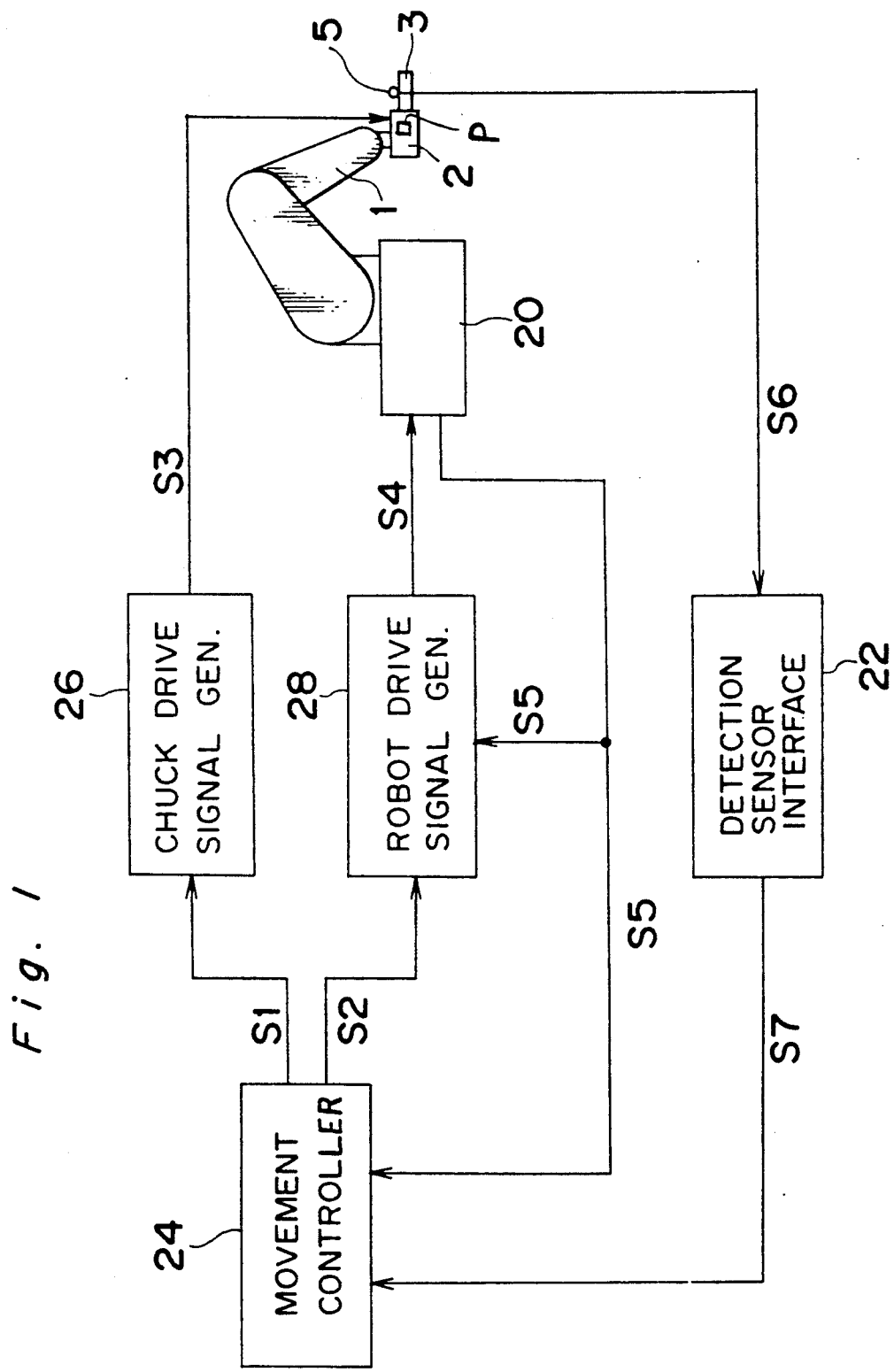
FIG. 1 is a block diagram showing a gripping system of the present invention.

Referring to FIG. 1, a block diagram of the gripping system of the present invention is shown. Reference numeral 20 is a robot having the arm 1 to which the gripping device is installed. The robot monitors the current arm and hand positions and produces a position signal S5 indicative of such positions. Reference numeral 22 is a detection sensor interface which receives the sensor signal S6 produced by the object detecting sensor 5 provided on the chuck 3, and produces a detection signal S7 based on the sensor signal S6.

Reference numeral 24 is a movement controller 24 for controlling the movement of the arm 1, hand 2 and chuck 3. The movement controller 24 produces a chuck drive signal S1 and a velocity signal S2 based on the detection signal S7 and the position signal S5. Reference numeral 26 is a chuck drive signal generator and produces a chuck drive signal S3 for driving chuck 3 based on the chuck drive signal S1. Reference numeral 28 is a robot drive signal generator and produces a robot drive signal S4 for driving the robot arm 1 and hand 2 based on the signals S5 and S2.

Figure 2:
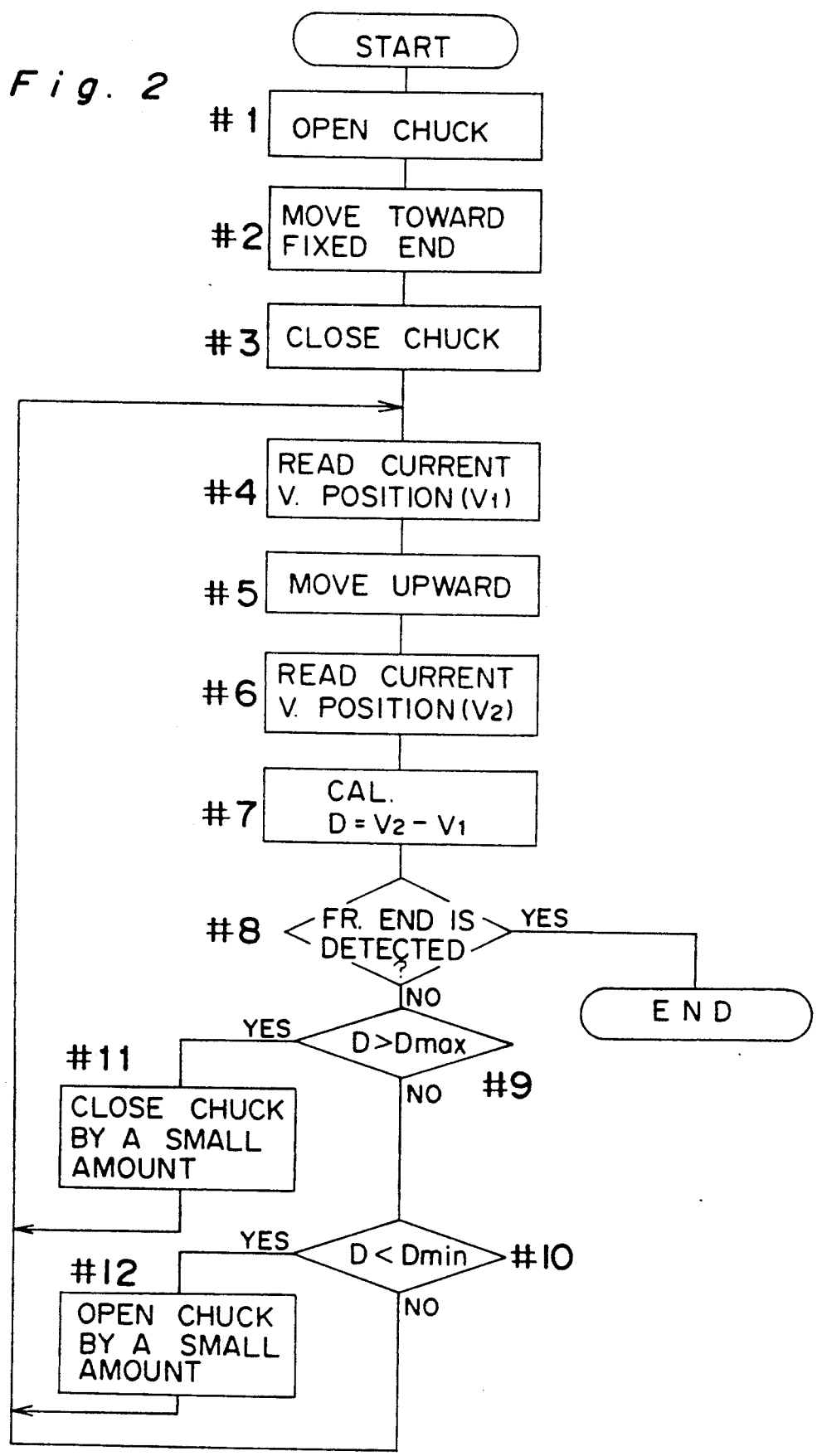
FIG. 2 is a flow chart showing the operation of the gripping system shown in FIG. 1.

The operation of the gripping device will now be described with reference to FIG. 2. First, the gripping device opens the chuck 3 (step #1) according to the chuck drive signal S3. Next, the robot arm 1 moves toward the fixed end 4a of the elongated object 4 according to the robot drive signal S4 (step #2). It is to be noted that the location of the fixed end 4a of the object 4 relative to the robot 20 will have been previously input into the movement controller 24. Thus, even when an object 4 is a flexible material, such as an electrical lead wire or a flat cable, that may be curved as shown in FIG. 1, the fixed end 4a of object 4 can be captured by the chuck 3 without any failure.

When the object detecting sensor 5 detects the presence of the object between the chuck claws 3a and 3b, the chuck is closed to grip the object 4 at the fixed end portion 4a near the circuit board 7 as shown in FIG. 3 (step #3). At this moment, the gripping pressure is set to an initial gripping pressure Pi such that chuck claws 3a and 3b softly touch the elongated object 4.

Then, the current vertical position V1 of the chuck 3 relative to the circuit board is read by a position detecting means (see step #4) of the robot 20 as schematically illustrated in FIG. 1.

A moving force is then applied to the arm 1 so as to move the chuck 3 in the upward direction as the chuck claws 3a and 3b slide along elongated object 4, allowing the circuit board 7 to remains in position (step #5).

After a predetermined period of time, the vertical position V2 of the chuck 3 is read again (step #6).

Then the moved amount D of chuck 3 during the predetermined period is calculated by the following equation (step #7).

$$D = V2 - V1$$

It is to be noted that since the predetermined period t is a constant value which is determined by the movement controller 24, the amount moved is substantially equal to the velocity of chuck 3 moving upwardly towards the free end 4b of the object 4.

Next, it is judged whether or not the detecting sensor 5 has detected the free end portion 4b of the object 4 (step #8). When it is judged as YES, the movement of arm 1 stops to terminate the chuck 3 closely adjacent the free end 4b of the object 4. On the contrary, when it is judged as NO, the operation proceeds to the next step #9.

At step #9, if it is so detected that the moved amount D calculated at step #7 is greater than a predetermined maximum amount $D_{max}$, chuck claws 3a and 3b are closed slightly so that the gripping pressure of chuck claws 3a and 3b is increased by a small amount $\Delta P1$ (step #11) to produce a greater braking effect of chuck claws 3a and 3b with respect to object 4. Thereafter, the operation returns to the step #4 to repeat the same operation through steps #4 to #8, but with the moved amount D being reduced.

At step #9, if it is detected that the moved amount D is not greater than $D_{max}$, the operation goes to the next step #10, at which it is judged whether or not the moved amount D is smaller than a predefined minimum amount $D_{min}$.

If it is so detected at step #10 that the moved amount D is smaller than a predefined minimum amount $D_{min}$, chuck claws 3a and 3b are opened slightly so that the gripping pressure of chuck claws 3a and 3b is decreased by a small amount $\Delta P2$ (step #12) to reduce the braking effect of chuck claws 3a and 3b with respect to object 4. Then the operation returns to the step #4, to repeat the same operation through steps #4 to #8, but with the moved amount D eventually being increased.

Thus, by steps #9 through #12, the velocity of chuck 3 moving towards the free end 4b of the object 4 is adjusted to be result in an appropriate value between $D_{max}$ and $D_{min}$.

Figure 4:
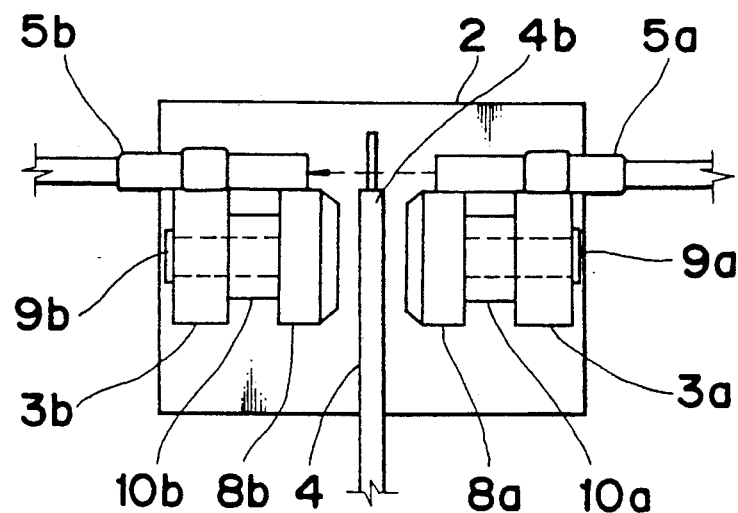
FIG. 4 is a front view showing chuck members of the gripping device shown in FIG. 3.

Referring to FIG. 4, the arrangement for detecting the free end 4b of the object 4 is shown in detail. The light emitter 5a and light receptor 5b, which define the object detecting sensor 5, are provided on the upper surface of the chuck claws 3a and 3b, respectively, so as to oppose one another. The light emitter 5a emits a light R toward the light receptor 5b which produces the detection signal S6. When the free end edge of the object 4 moves past the detecting sensor 5, the emitted light R from the light emitter 5a reaches the light receptor 5b to produce the detection signal S6 indicating the arrival of chuck 3 at the free end portion 4b, as shown by an imaginary line in FIG. 3. This detection is carried out in step #8. Immediately thereafter, the chuck claws 3a and 3b are further closed to tightly hold the free end 4b of the object 4.

Since chuck 3 slidingly moves along the object 4 from its fixed end 4a towards the free end 4b with the moving velocity D being controlled by opening or closing the chuck 3 to obtain an appropriate velocity as described above, the free end 4b of the object 4 can be captured without any failure.

Figure 5:
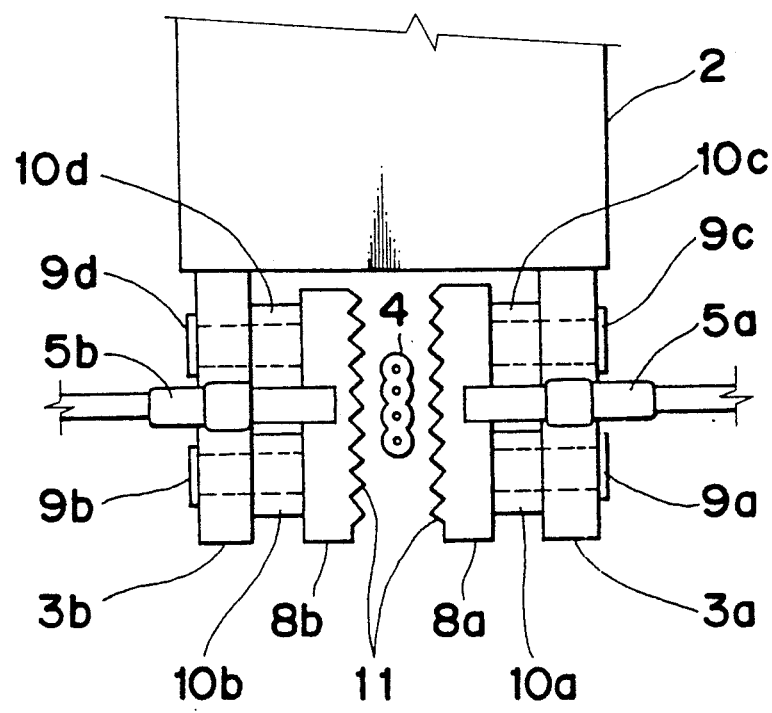
FIG. 5 is a top plan view showing the chuck members of the gripping device shown in FIG. 3.
Figure 6:
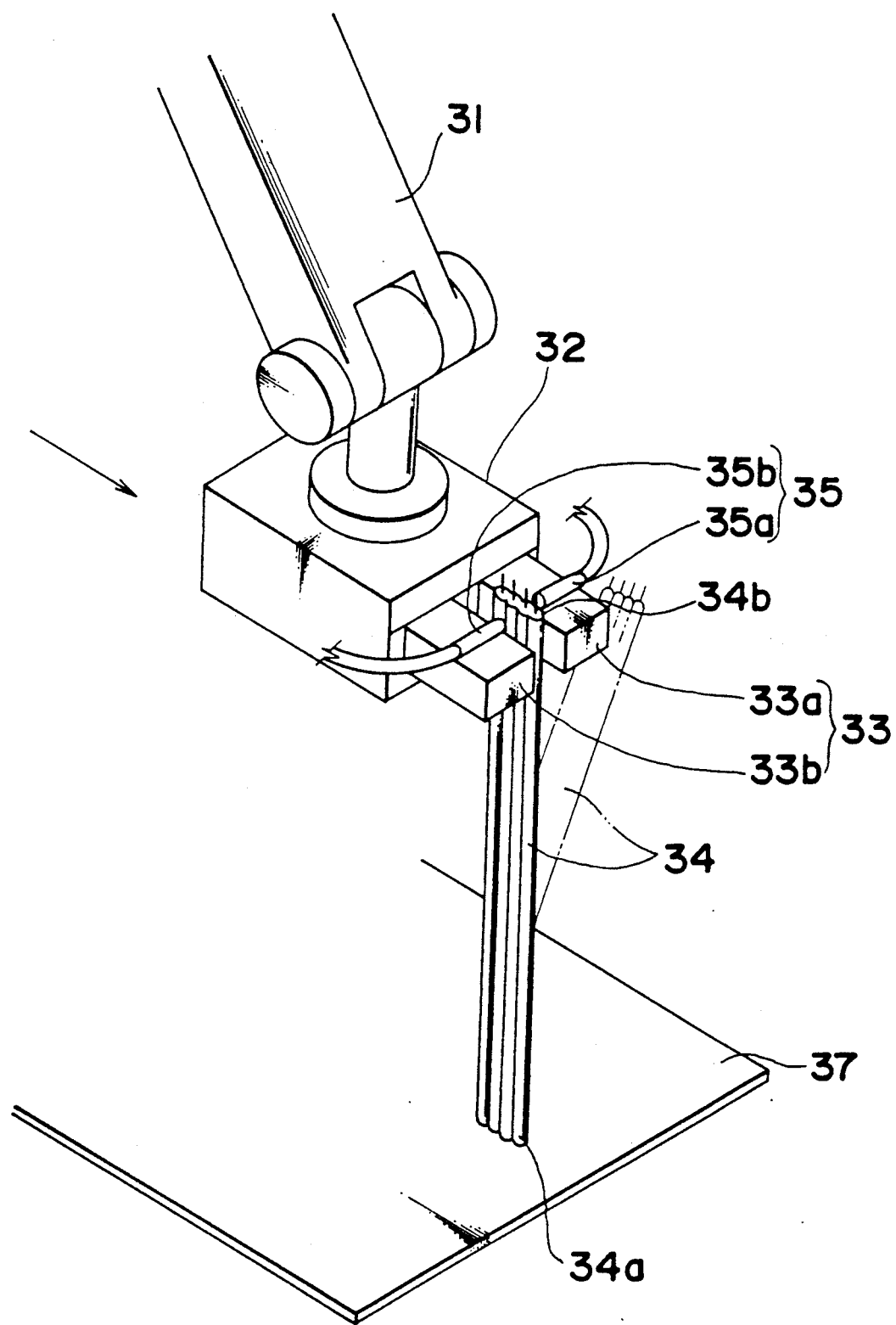
FIG. 6 is perspective view showing a gripping device operated by the prior art gripping system.

Referring to FIGS. 4 and 5, contact members 8a and 8b for contacting the object 4 are provided on the chuck claws 3a and 3b, respectively, using pins 9a, 9b, 9c, and 9d. The pins 9a, 9c and 9b, 9d are inserted in chuck claws 3a and 3b, respectively, in a gripping direction. Furthermore, elastic bodies 10a, 10b, 10c and 10d such as a spring or rubber sleeves are mounted on pins 9a, 9b, 9c, and 9d, respectively, at positions between the movable members 8a, 8b, 8c, and 8d and the chuck claws 3a and 3b, respectively.

Thus, if the chuck 3 is opened or closed while holding the object 4 therein, the gripping strength changes over a wide range relative to the movement of the chuck claws 3a and 3b, enabling the chuck 3 to hold the object 4 with varying pressures.

Furthermore, referring particularly to FIG. 5, a plurality of parallel grooves 11 extending in a vertical direction with respect to the circuit board are provided on the surface of contact members 8a and 8b. These grooves prevent the object 4 from slipping from the held position between the chuck claws 3a and 3b. By this arrangement, it is possible to prevent object 4 from being moved away from chuck 3 during the movement of chuck 3 toward the free end 4b of the object 4.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A gripping system for gripping an elongated object having a fixed end fixed to a base and a free end remote from the fixed end, comprising:
   a robot having a robot arm and a chuck mounted to said robot arm for gripping objects, said chuck being movable between open and closed positions;
   robot driving means for moving said robot arm;
   chuck driving means for driving said chuck between said open and closed positions;
   object detecting means for detecting when the object is positioned in the chuck and when the chuck is at the free end of the object;
   control means for controlling said robot driving means and said chuck driving means to first cause said chuck to grip the object at said fixed end thereof, and to then cause said chuck to slide longitudinally along the object until said object detecting means detects that said chuck is at the free end of the object;
   wherein said robot includes position detecting means for detecting positions of the chuck relative to a predetermined position;
   wherein said control means is further operable to calculate distance travelled by said chuck between a first position detected by said position detecting means at a first time and a second position detected by said position detecting means at a second time a predetermined period of time after said first time; and wherein said control means is still further operable to control the velocity of said chuck in moving longitudinally along the object such that said distance travelled by said chuck during said predetermined period of time is maintained between first and second predetermined distances, by causing said chuck driving means to drive said chuck toward said closed position if said distance travelled exceeds said first predetermined distance and to drive said chuck toward said open position if said distance travelled is less than said second predetermined distance.

2. A gripping system as recited in claim 1, wherein said object detecting means comprises a light emitter and a light receptor, each being mounted for longitudinal movement with said chuck.

3. A gripping system as recited in claim 1, further comprising contact members mounted on said chuck for contacting the object; and elastic bodies respectively mounted between said chuck and said contact members.

4. A gripping system as recited in claim 3, wherein each of said contact members has a plurality of grooves formed in a surface thereof, said grooves extending in the longitudinal direction in which the object is adapted to extend.

* * * * *